(12) United States Patent
Jang

(10) Patent No.: US 8,460,820 B2
(45) Date of Patent: Jun. 11, 2013

(54) SECONDARY BATTERY

(75) Inventor: Hwan-Ho Jang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 162 days.

(21) Appl. No.: 13/177,459

(22) Filed: Jul. 6, 2011

(65) Prior Publication Data

US 2012/0009466 A1    Jan. 12, 2012

(30) Foreign Application Priority Data

Jul. 12, 2010    (KR) ........................ 10-2010-0066857

(51) Int. Cl.
 *H01M 2/08*    (2006.01)
(52) U.S. Cl.
 USPC ............................ 429/175; 429/121; 429/163
(58) Field of Classification Search
 USPC .......................... 429/121, 163, 167, 175, 176
 See application file for complete search history.

(56) References Cited

U.S. PATENT DOCUMENTS

2005/0042508 A1\* 2/2005 Kim et al. ..................... 429/174
2006/0057462 A1\* 3/2006 Jeon .............................. 429/185

FOREIGN PATENT DOCUMENTS

| KR | 10 2000 0060913 A | 10/2000 |
| KR | 10 2001 0038809 A | 5/2001 |
| KR | 10-2005-0120177 A | 12/2005 |

OTHER PUBLICATIONS

KIPO Office action dated Sep. 23, 2011 for the corresponding Korean priority application No. 10-2010-0066857, 3 pages.
KIPO Office action dated Jun. 20, 2012 for Korean priority Patent application No. 10-2010-0066857, (1 page).

\* cited by examiner

*Primary Examiner* — Patrick Ryan
*Assistant Examiner* — Ben Lewis
(74) *Attorney, Agent, or Firm* — Christie, Parker & Hale, LLP

(57) ABSTRACT

A secondary battery in which bending of a portion of long sides of a cap assembly is prevented or reduced during insertion of the cap assembly into a can. A secondary battery includes a can having an opening and accommodating an electrode assembly, and a cap assembly sealing the opening of the can and including a cap plate including long sides and short sides extending between the long sides, wherein ductility of the short sides of the cap assembly is greater than that of portions of the cap plate other than the short sides.

14 Claims, 2 Drawing Sheets

SECONDARY BATTERY

CROSS-REFERENCE TO RELATED APPLICATION

This application claims priority to and the benefit of Korean Patent Application No. 10-2010-0066857, filed on Jul. 12, 2010 in the Korean Intellectual Property Office, the entire content of which is incorporated herein by reference.

BACKGROUND

1. Field

Aspects of embodiments of the present invention relate to a secondary battery, and more particularly to a secondary battery including a cap assembly in which bending is prevented or reduced.

2. Description of the Related Art

Common polygonal secondary batteries include an electrode assembly, a can accommodating the electrode assembly, and a cap assembly combined with the can. The top of the can is open and the cap assembly is combined by sealing the opening of the can. In this configuration, the size of the cap assembly is set larger than the opening of the can and the cap assembly is press-fitted in the can.

However, when the cap assembly is inserted in the can, as described above, a portion of the long sides of the cap assembly is bent in the can. Accordingly, it is difficult to pack the outer side of a bare cell, because the outer side of the bare cell is bent by the above structure.

SUMMARY

According to an aspect of embodiments of the present invention, a secondary battery can prevent or reduce a portion of the long sides of a cap assembly from bending when being inserted in a can, by heat-treating the short sides of the cap assembly.

According to an embodiment of the present invention, a secondary battery includes a can having an opening and accommodating an electrode assembly, and a cap assembly sealing the opening of the can and including a cap plate including long sides and short sides extending between the long sides, wherein ductility of the short sides of the cap assembly is greater than that of portions of the cap plate other than the short sides.

In one embodiment, the short sides of the cap assembly are heat-treated.

In one embodiment, the cap assembly may be made of aluminum or an aluminum alloy.

In one embodiment, hardness of the short sides is 40 Barcol to 48 Barcol.

In one embodiment, hardness of portions of the cap plate other than the short sides is 50 Barcol to 55 Barcol.

In one embodiment, hardness of the short sides is 40 Barcol to 48 Barcol, and hardness of portions of the cap plate other than the short sides is 50 Barcol to 55 Barcol.

In one embodiment, the cap plate is heat-treated in regions having a width of 1 mm to 5 mm extending from the short sides toward a center portion of the cap assembly.

According to another embodiment of the present invention, a cap assembly for sealing a secondary battery includes a cap plate including long sides and short sides extending between the long sides, wherein ductility of the short sides of the cap assembly is greater than that of portions of the cap plate other than the short sides.

According to an aspect of embodiments of the present invention, packing a bare cell is facilitated by preventing or reducing bending of a portion of long sides of a cap assembly when the cap assembly is inserted into a can.

BRIEF DESCRIPTION OF THE DRAWINGS

The accompanying drawings, together with the specification, illustrate some exemplary embodiments of the present invention, and, together with the description, serve to explain features and principles of the present invention to those of ordinary skill in the art.

DETAILED DESCRIPTION

Figure 1:
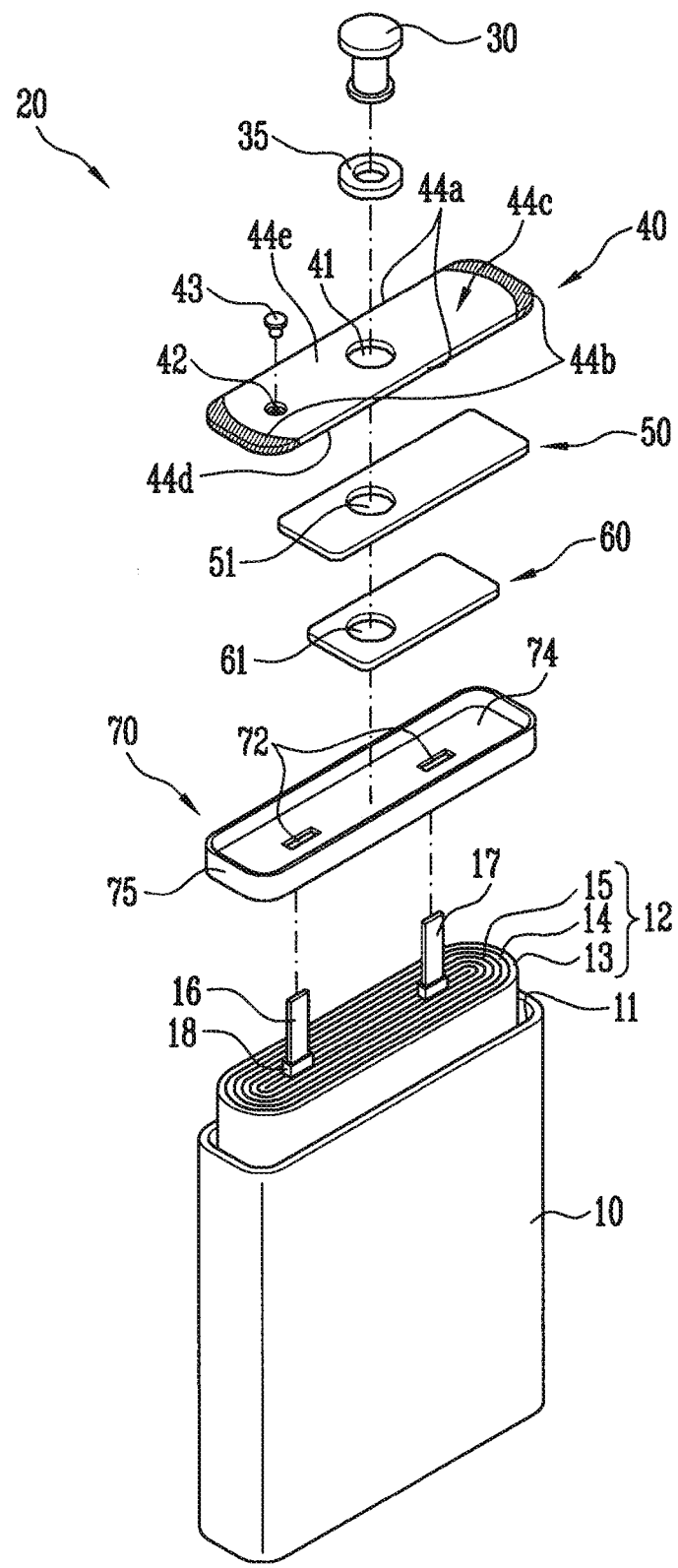
FIG. 1 is an exploded perspective view of a secondary battery according to an embodiment of the present invention.

In the following detailed description, some exemplary embodiments of the present invention are shown and described, by way of illustration. As those skilled in the art would realize, the described embodiments may be modified in various ways without departing from the spirit and scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

A secondary battery according to an embodiment of the present invention is described herein with reference to the accompanying drawings showing embodiments of the present invention.

FIG. 1 is an exploded perspective view showing a secondary battery according to an embodiment of the present invention.

Referring to FIG. 1, a secondary battery according to an embodiment of the present invention includes a can 10 having an opening 11 at the top and accommodating an electrode assembly 12, and a cap assembly 20 sealing the opening 11 of the can 10. In one embodiment, the cap assembly 20 includes a cap plate 40, an electrode terminal 30, an insulating plate 50, a terminal plate 60, and a gasket 35. Further, the cap plate 40 has a pair of long sides 44a, a pair of short sides 44b connecting the ends of the long sides 44a, and a top 44c and a bottom 44d which are formed, or defined, by the long sides 44a and the short sides 44b. In one embodiment of the present invention, when the cap assembly 20 is inserted in the can 10, the short sides 44b of the cap plate 40 are heat-treated, and these may be referred to as the short sides 44b of the cap assembly 20, for the convenience of description.

The cap assembly 20 is press-fitted in the can 10 of the secondary battery. In an embodiment of the present invention, ductility of the short sides 44b of the cap assembly 20 is greater than that of portions 44e of the cap plate 40 other than the short sides 44b in order to prevent or reduce a portion of the long sides 44a of the cap assembly 20 from bending. One of the methods of increasing the ductility, according to an embodiment of the present invention, is heat-treating the short sides 44b of the cap assembly 20.

The cap assembly 20, in one embodiment, is made of aluminum or an aluminum alloy. Further, in one embodiment, ductility of the short sides 44b is increased as compared with the portions 44e of the cap plate 40 other than the short sides 44b by heat-treating the short sides 44b of the cap assembly 20. Further, in one embodiment, hardness of the short sides 44b is decreased as compared with the portions 44e of the cap plate 40 other than the short sides 44b by heat-treating the short sides 44b.

In one embodiment, hardness of the portions 44e of the cap plate 40 other than the short sides 44b is in the range of 50 Barcol to 55 Barcol. In one embodiment, hardness of the short sides 44b is within the range of 40 Barcol to 48 Barcol. If the hardness of the short sides 44b is less than 40 Barcol, ductility is too great and the short sides 44b are deformed before inserted, such that it is difficult to seal the opening 11 of the can 10. Further, if the hardness of the short sides 44b is greater than 50 Barcol, ductility is similar to that of the portions 44e of the cap plate 40 other than the short sides 44b, such that a portion of the long sides 44a of the cap assembly 20 may be bent when the cap assembly 20 is inserted into the can 10.

The configuration of the rectangular secondary battery according to an embodiment of the present invention is described below in further detail.

First, the electrode assembly 12 is formed by winding an anode plate 15 and a cathode plate 13 with a separator 14 therebetween. An anode tap 16 is connected to the anode plate 15, protruding upward from the electrode assembly 12, and a cathode tap 17 is connected to the cathode plate 13, protruding upward from the electrode assembly 12. The anode tap 16 and the cathode tap 17 are spaced from each other at a predetermined distance and electrically connected in the electrode assembly 12.

In one embodiment, a lamination tape 18 is wound at the portion where the anode tap 16 and the cathode tap 17 are drawn from the electrode assembly 12. Further, the lamination tape 18 blocks heat generated from the anode tap 16 or the cathode tap 17 and prevents or substantially prevents the electrode plate 12 from being pressed by the edges of the anode tap 16 and the cathode tap 17.

In one embodiment, the anode tap 16 and the cathode tap 17 are electrically connected with the anode plate 15 and the cathode plate 13 of the electrode assembly 12, respectively, and drawn out to the opening 11 of the can 10. In one embodiment, the anode tap 16 and the cathode tap 17 are electrically connected with the can 10 or the terminal plate 60 and protruded through respective lead-through holes 72 of an insulating case 70 fixed to the upper portion of the electrode assembly 12 in the can 10.

In one embodiment, the anode plate 15 and the cathode plate 13 are formed by dry coating a slurry on a thin aluminum layer and a thin copper layer, respectively. The slurry contains the active substances of the anode plate 15 and the cathode plate 13 and a fixing agent bonding the active substances to the metal layer. Further, for lithium secondary batteries, although the anode active substance is usually a lithium containing oxide and the cathode active substance may be any one of hard carbon, soft carbon, graphite, or carbon substances, embodiments of the present invention are not limited to such lithium secondary batteries.

The can 10 accommodates the electrode assembly 12 through the opening 11 and, in one embodiment, a horizontal cross section of the can 10 has a rectangular shape with rounded corners. However, the horizontal cross-sectional shape of the can 10 is not limited to the above, and though not shown, the horizontal cross-sectional shape of the can 10 may be rectangular or elliptical. Further, the can 10 may be manufactured easily by deep drawing metal.

In one embodiment, the cap assembly 20, as described above, includes the cap plate 40, the electrode terminal 30, the insulating plate 50, the terminal plate 60, and the gasket 35. The cap plate 40 defines one side of the can 10 by sealing the opening 11 of the can 10 when the cap assembly 20 and the can 10 are combined. In one embodiment, the cap plate 40 may be attached to the can 10 for sealing the opening 11 by welding or any other suitable device or method. Further, in one embodiment, the cap plate 40 is electrically connected with one of the anode tap 16 or the cathode tap 17 drawn out through the lead-through holes 72 of the insulating case 70. Further, in one embodiment, the cap plate 40 has a first terminal hole 41 for combination with the gasket 35 and an electrolyte inlet 42 for injecting an electrolyte. The electrolyte inlet 42 formed in the cap plate 40 is used as a path for injecting an electrolyte into the can 10. Further, the electrolyte inlet 42 may be sealed with a cap 43 after the electrolyte is injected.

The gasket 35 is provided for insulation between the electrode terminal 30 and the cap plate 40, and the cap plate has the first terminal hole 41 for protruding the electrode terminal 30 therethrough, and the electrode terminal 30 is combined with the gasket 35 through the first terminal hole 41.

Further, the insulating plate 50 described above is interposed between the cap plate 40 and the terminal plate 60 for insulation. Further, a second terminal hole 51 for protruding the electrode terminal 30 therethrough is formed through the insulating plate 50.

In one embodiment, the terminal plate 60 is electrically connected with the electrode terminal 30 at a third terminal hole 61. Further, in one embodiment, the terminal plate 61 is electrically connected with the other one of the anode tap 16 or the cathode tap 17 which is not connected with the cap plate 40. That is, if the cap plate 40 is electrically connected with the anode tap 16, the terminal plate 60 is connected with the cathode tap 17 and, accordingly, electric connection between the electrode terminal 30 and the cathode tap 17 can be achieved.

The insulating case 70 is positioned between the electrode assembly 12 and the cap assembly 20 for electrical insulation and is inserted in the upper portion of the can 10. The insulating case 70 may be made of an electrically insulative hard plastic resin. Therefore, when the insulating case 70 is inserted in the can 10, it is not substantially deformed by the electrolyte and provides electrical insulation between the electrode assembly 12 and the cap assembly 20.

When the insulating case 70 is made of hard plastic resin, as described above, the elasticity is small and it is difficult to insert the insulating case 70 into the can 10 and, in one embodiment, the insulating case 70 includes a base 74 and a support portion 75 to be stably inserted in the can 10 in order to overcome this problem. In one embodiment, the base 74 is a bottom portion of the insulating case 70 and the support portion 75 is at an outer side of the insulating case 70, such as protruding upward from an outer region of the base 74, as shown in FIG. 3.

The base 74 of the insulating case 70, in one embodiment, is formed of a plate having a uniform or substantially uniform thickness and has a shape similar to the horizontal cross-sectional shape of the can 10, particularly the cross-sectional shape of the space in the can other than the space where the electrode assembly 12 is accommodated. Further, in one embodiment, the base 74 of the insulating case 70 is slightly larger than the cross section of the space in the can 10 for press-fitting the insulating case 70 in the can 10. In one embodiment, an electrolyte inlet (not shown) and the lead-through holes 72 are formed through the base 74 of the insulating case 70.

Figure 2:
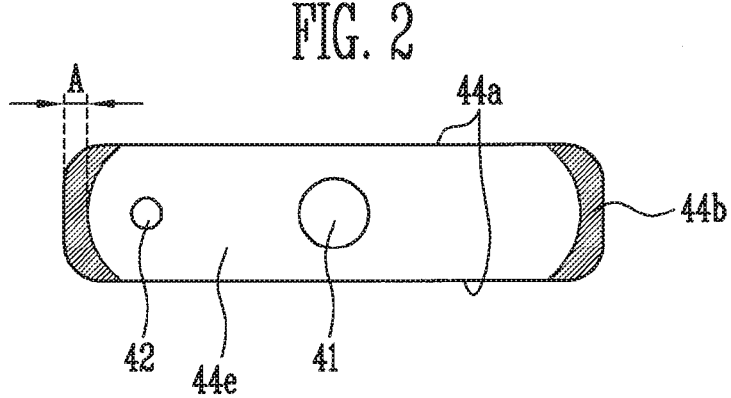
FIG. 2 is a plan view of a cap plate of the secondary battery of FIG. 1.

FIG. 2 is a plan view of the cap plate 40 showing the short sides 44b having been heat-treated.

Figure 3:
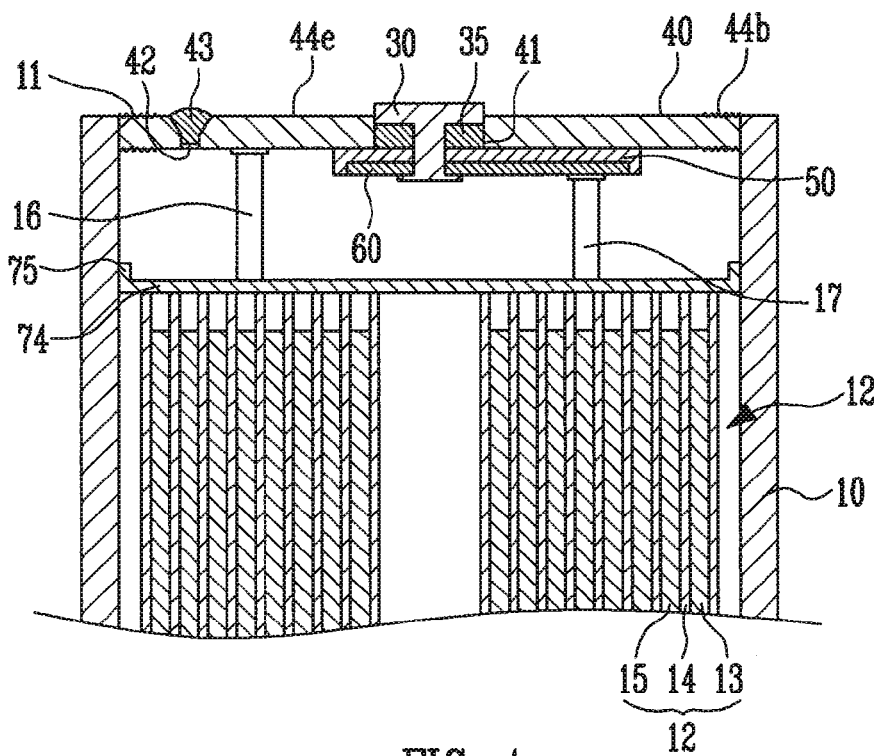
FIG. 3 is a partial cross-sectional view of the secondary battery of FIG. 1 showing a cap assembly of the secondary battery inserted in a can of the secondary battery.

Referring to FIGS. 2 and 3, the cap assembly 20 is inserted into the can 10, with the short sides 44b heat-treated for increased ductility of the short sides 44b as compared with the portions 44e of the cap plate 40 other than the short sides 44b. The hardness decreases with the increase in ductility, such that the short sides 44b of the cap assembly 20 become softer than the portions 44e of the cap plate 40 other than the short sides 44b.

With reference to FIG. 2, the short sides 44b of the cap assembly 20, in one embodiment, are heat-treated in a region having a width A of about 1 mm to about 5 mm extending from the short sides 44b toward the center of the cap assembly 20. When the short sides 44b are heat-treated in a region having a width less than 1 mm toward the center of the cap assembly 20, the heat-treated area is too small such that it is difficult to gain the effect of the heat treatment.

Further, when the short sides 44b are heat-treated in a region having a width greater than 5 mm toward the center of the cap assembly 20, a portion of the cap assembly 20 may be bent when the cap assembly 20 is inserted into the can 10.

Figure 4:
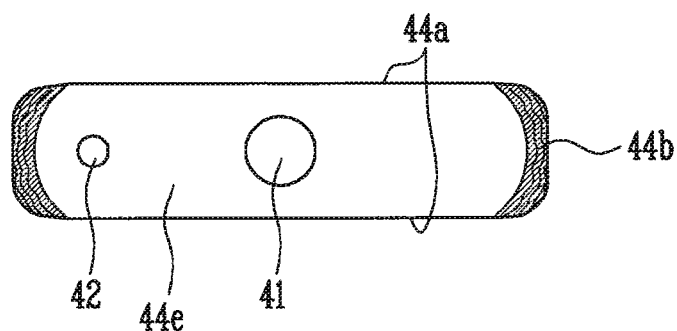
FIG. 4 is a plan view of a cap plate of the cap assembly of FIG. 3 shown in a state in which it is inserted in the can.

FIG. 3 is a cross-sectional view of the secondary battery 10 showing the cap assembly 20 inserted in the can 10, and FIG. 4 is a plan view showing the cap plate 40 of the cap assembly 20 shown in a state in which it is inserted in the can 10.

Referring to FIGS. 3 and 4, when the cap assembly 20 is inserted into the can 10, with the short sides 44b heat-treated, the cap assembly 20 is inserted, with only the heat-treated portion (i.e. the short sides 44b) crushed or deformed. Further, ductility of the short sides 44b is increased and hardness is decreased, as compared with the portions 44e of the cap assembly 20 other than the short sides 44b, by heat-treating the short sides 44b of the cap assembly 20 made of aluminum or an aluminum alloy. Therefore, according to embodiments of the present invention, the cap assembly 20 is inserted into the can 10 with only the heat-treated short sides 44b crushed or deformed in the can 10.

Therefore, according to embodiments of the present invention, it is possible to insert the cap assembly 20 in the can 10 without bending a portion of the long sides 44a of the cap assembly 20. Therefore, it is possible to improve workability in packing, because the outer side of the bare cell does not bend.

Embodiments of the secondary battery of the present invention are described in more detailed hereinafter with reference to certain embodiments.

Table 1 shows whether the cap assembly 20 according to an embodiment of the present invention and a comparative example bend.

TABLE 1

| Item | Hardness of heat-treated short sides (Barcol) | Hardness of portions of cap assembly other than heat-treated short sides (Barcol) | Bending or No Bending of cap assembly |
|---|---|---|---|
| Embodiment of Present Invention | 40-48 | 50-53 | Rounded portion of short side heat-treated, No Bending |

TABLE 1-continued

| Item | Hardness of non-heat-treated cap assembly (Barcol) | Bending or No Bending of cap assembly |
|---|---|---|
| Comparative example | 50-53 | no heat treatment, Bending |

Referring to Table 1, in an embodiment of the present invention in which the short sides 44b were heat-treated to have hardness in the range of 40 to 48 Barcol, there was not bending in the cap assembly. However, in the comparative example in which the cap assembly is not heat-treated and the entire cap assembly has hardness in the range of 50 to 53 Barcol, it can be seen that the center portion of the cap assembly bends.

Therefore, it is possible to prevent or reduce the cap assembly 20 from bending when inserted into the can 10, by heat-treating the short sides 44b of the cap assembly 20 to decrease hardness of the short sides 44b, as described above in accordance with embodiments of the present invention.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A secondary battery comprising:
   a can having an opening and accommodating an electrode assembly; and
   a cap assembly sealing the opening of the can and comprising a cap plate including long sides and short sides extending between the long sides,
   wherein ductility of the short sides of the cap assembly is greater than that of portions of the cap plate other than the short sides.

2. The secondary battery as claimed in claim 1, wherein the short sides of the cap assembly are heat-treated.

3. The secondary battery as claimed in claim 1, wherein the cap assembly is made of aluminum or an aluminum alloy.

4. The secondary battery as claimed in claim 1, wherein hardness of the short sides is 40 Barcol to 48 Barcol.

5. The secondary battery as claimed in claim 1, wherein hardness of portions of the cap plate other than the short sides is 50 Barcol to 55 Barcol.

6. The secondary battery as claimed in claim 1, wherein hardness of the short sides is 40 Barcol to 48 Barcol, and hardness of portions of the cap plate other than the short sides is 50 Barcol to 55 Barcol.

7. The secondary battery as claimed in claim 1, wherein the cap plate is heat-treated in regions having a width of 1 mm to 5 mm extending from the short sides toward a center portion of the cap assembly.

8. A cap assembly for sealing a secondary battery, the cap assembly comprising:
   a cap plate including long sides and short sides extending between the long sides,
   wherein ductility of the short sides is greater than that of portions of the cap plate other than the short sides.

9. The cap assembly as claimed in claim 8, wherein the short sides are heat-treated.

10. The cap assembly as claimed in claim 8, wherein the cap assembly is made of aluminum or an aluminum alloy.

11. The cap assembly as claimed in claim 8, wherein hardness of the short sides is 40 Barcol to 48 Barcol.

12. The cap assembly as claimed in claim 8, wherein hardness of portions of the cap plate other than the short sides is 50 Barcol to 55 Barcol.

13. The cap assembly as claimed in claim 8, wherein hardness of the short sides is 40 Barcol to 48 Barcol, and hardness of portions of the cap plate other than the short sides is 50 Barcol to 55 Barcol.

14. The cap assembly as claimed in claim 8, wherein the cap plate is heat-treated in regions having a width of 1 mm to 5 mm extending from the short sides toward a center portion of the cap assembly.

* * * * *